United States Patent
Platzer et al.

[15] 3,684,320
[45] Aug. 15, 1972

[54] PIPE JOINTS

[72] Inventors: Herbert Platzer; Erich Singer; Frans Wassermann, all of Innsbruck, Austria

[73] Assignee: Tiroler Rohren-und Metallwerke Aktiengesellschaft, Solbad Hall/Tirol, Austria

[22] Filed: April 28, 1970

[21] Appl. No.: 32,514

[52] U.S. Cl. .................. 285/81, 285/305, 285/374, 285/403
[51] Int. Cl. ............................................. F16l 21/02
[58] Field of Search ........ 285/305, 374, 81, 403, 400, 285/399, 309

[56] References Cited

UNITED STATES PATENTS

| | | | |
|---|---|---|---|
| 3,480,302 | 11/1969 | Jeffrey et al. | 285/400 X |
| 1,474,437 | 11/1923 | McWane | 285/374 X |
| 1,474,435 | 11/1923 | McWane | 285/374 X |
| 1,588,444 | 6/1926 | Carson | 285/374 |
| 3,239,244 | 3/1966 | Leinfelt | 285/305 X |
| 1,072,736 | 9/1913 | Kelly | 285/81 |
| 3,433,509 | 3/1969 | Jeffrey et al. | 285/374 |
| 763,542 | 6/1904 | Crawford et al. | 285/374 X |

FOREIGN PATENTS OR APPLICATIONS 21,398  4/1911  Norway .................... 285/374

*Primary Examiner*—Thomas F. Callaghan
*Attorney*—Cushman, Darby & Cushman

[57] ABSTRACT

A joint for pipes or the like in which each pipe section has a first narrow end and a second socket end adapted to receive the narrow end and the narrow end has external supporting elements circumferentially arranged on the exterior thereof while the socket end has at least one internally internally protruding projection circumferentially arranged on the interior thereof arcuately adjacent the supporting elements. The relative diameters of the supporting elements and projections are arranged such that the projection can concentrically receive the supporting elements. Locking members are then inserted through recesses formed in the projections and slid circumferentially to lock the adjoining pipes to one another by abutting the projections and supporting elements, the mating surfaces of the projections and locking members being spherically formed to allow a certain angular displacement between adjoining pipe sections. Each joint between pipe sections also includes a sealing ring of elastomeric material which is mounted on the circumference of the narrow end in a position axially removed from projection and supporting elements. The sealing ring projects into a depression on the interior surface of socket end to seal the joint between the pipes.

6 Claims, 4 Drawing Figures

PIPE JOINTS

The present invention relates to a joint for pipes, pipe sections and the like, preferably made by centrifugal casting methods.

There are already known pipe joints, in which the narrow end of one of the pipes to be joined is pushed into the socket end of the other pipe and the joint is sealed in a suitable manner. In the known joint of this type, the seal is formed by a fitted soft rubber ring with a hard rubber insert on one side, the joint being achieved by compressing the soft rubber ring. This pipe joint permits a slight angling of the pipeline and is sufficient, where the pressure of the soil forms sufficient security against the narrow end being withdrawn from the socket end.

However, in practice, there occur cases, where, especially with bent pipelines or with pipelines which are not positioned in the soil, and where the friction of the rubber seal is not sufficient to prevent the joint from being undone, so that the narrow and socket ends must be connected by a compression-type safety device. The arrangement of such devices makes it usually unnecessary to secure bends and angles by concreting.

Various compression-type safety devices have already been proposed. These known devices have tightening bolts, tightening plates and the like which connect the narrow and socket ends one to the other and prevent any subsequent, undesirable, relative movements between them. However, these devices are rather complicated and bulky, because the tightening elements must be so dimensioned that they are capable of taking up the considerable axial forces to which the pipeline is subjected when it is under pressure. Thus, these tightening bolts or plates must have a sufficient cross-section and also the eyelets, lugs and the like, whereby the tightening bolts or plates are connected with the two pipe ends, must be correspondingly dimensioned. Hence, such a construction of the safety device is rather expensive and mechanically unsatisfactory.

There are also known joints for pipes with smaller diameters, comprising the so-called bayonet lock. The bayonet lock provides sufficient protection against thrust but requires that the pipes to be connected should be rotated through a certain angle relative to each other. Although this angle need not be as much as 90° angle, it must be enough that bayonet lock is established. However, relative rotation of heavy pipes, such as made by centrifugal casting, and especially if they are laid in ditches, is virtually Impossible. Moreover, rotation can only be effected after the rubber insert has been fitted and experience shows that the resulting frictional forces cannot be overcome. Consequently, the conventional bayonet lock cannot be used in practice. The invention consists in a connection for pipes, pipe sections and the like, made preferably by centrifugal casting methods, wherein the narrow end of a first pipe to be connected is inserted into the socket end of a second pipe, preferably via a ring seal, and the narrow end and the socket end are joined together by a thrust securing device wherein the narrow end of the first pipe has external supporting elements and the socket end of the second pipe has at least one internally projecting projection, the diameter of the radially inner dimension of the projection being at least equal to the diametric distance between the outer surfaces of the supporting elements and insertable locking members which rest both on the supporting elements and on the projection.

The present invention eliminates the above mentioned disadvantages of known pipe joints by providing a pipe joint of the kind hereinbefore mentioned, which has the advantages of the bayonet joint, without, however, requiring a relative rotation of the two pipes to be joined together. According to the invention, the outer circumference of the narrow pipe end is provided with supporting elements and the socket end has at least one projection protruding towards the inside, wherein the diameter of the radially inward dimension of the projection is at least equal to the diametric distance between the outer surfaces of the supporting elements, and wherein locking elements may be inserted resting on the supporting elements and on the projection. Hence, in the construction according to the invention, the supporting elements of the narrow pipe end do not rest directly on the projection of the socket end, and this projection is so dimensioned that, when the pipes are joined, it can be pushed over the supporting elements and the thrust joint is made only by inserting the locking members between the supporting elements and the projection, forming a bayonet-like closure. Hence, according to the invention, external tightening bolts or tightening plates are no longer necessary, which require large additional space and necessitate also the fitting of hooks, eyelets and the like on the two pipe ends to be joined. Hence, the pipe ends may have a simple construction but a sufficient joint is nevertheless ensured.

In a preferred embodiment of the invention, the socket has at least one segment-shaped recess for introducing the locking members, in the direction of the circumference; the length of this recess is only slightly more than the length of the locking members. The locking members can be inserted through this segment-shaped recess and be placed into the position in which they rest on the supporting elements and on the projection. Preferably, the recess or recesses are offset relative to the supporting element and the locking elements can be rotated or turned, after being fitted into the recesses, into a position between the projection of the socket and a supporting element. In this construction, loss of the locking members in the radial direction is eliminated and it is possible to introduce two connecting elements through one recess, one being turned in one direction and the other in the other direction. Thus, it is generally sufficient to make do with one single recess. According to the invention, the recesses may be formed in that at the point of the recess there is no projection in the sleeve, enabling the connecting elements to be inserted.

To prevent an excessive insertion or rotation of the locking members and to keep the locking members in a position corresponding to the supporting elements, each locking member has, according to a further feature of the invention, a lug resting in the locking position on an edge of the recess, thereby limiting the inserting movement. Preferably, the locking members are secured conveniently by a bendable tab of the supporting strip.

The supporting elements may be fitted for example, into grooves of the narrow pipe end. However, the provision of these grooves weakens to some extent the walls of the narrow end and it is, therefore, more convenient to fix the supporting elements by welding. This type of mounting makes it also possible to secure the locking members against loss by the unwelded end of the supporting elements by bending the same over after the insertion of the locking members, thereby preventing the same from sliding out.

To make possible also in this arrangement a bending of the pipeline within certain limits and to adapt the pipeline to unevennesses of the soil, the contacting surfaces of the projection and the locking members have a spherical configuration, and these surfaces have preferably the same radius.

The invention will be further described, by way of example, with reference to the accompanying drawings in which:

FIG. 4 shows a locking member for making the pipe joint according to the invention.

Figure 1:
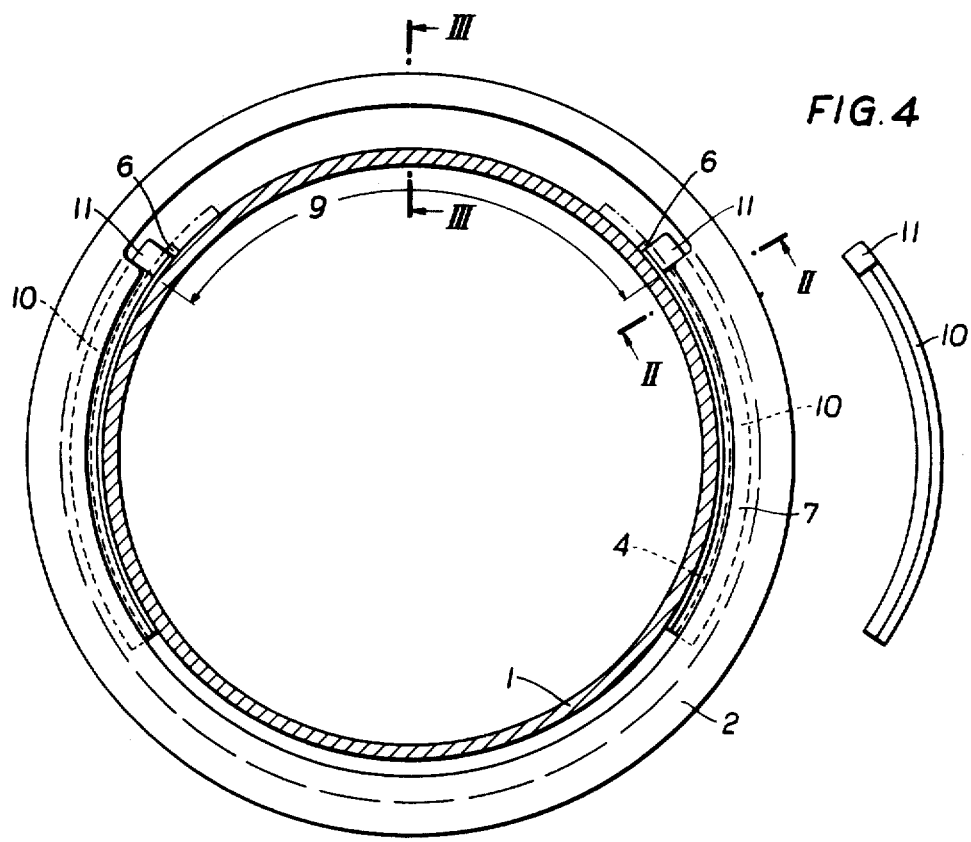
FIG. 1 is a cross-section of a tube joint according to the invention.

To effect the pipe joint, the narrow end 1 of one pipe is pushed into the socket end 2 of the other pipe with insertion of a ring seal 3 which may be made of rubber. The outer surface of the narrow end 1 has two or, with pipes with larger diameters, more supporting elements 4 which are connected to the narrow end 1 by a weld 5 extending over the major part of the length. One end 6 of the supporting elements 4, indicated by dash-dot lines in FIG. 1 is not fixed by welding and may be bent over into a position parallel to the axis of the pipe. The supporting element may be, for example, a steel strip with square cross-section or a spherical casting.

The socket end 2 has an inwardly extending projection 7, extending over the major part of its circumference. The diameter D of the radially inner dimension 8 of the projection 7, is larger than the diametric distance d between the outer surfaces of the supporting elements 4, so that during the joining of the pipe ends, the projection 7 may be pushed over the supporting elements 4 welded to the narrow pipe end 1.

The socket end 2 has also a segment-shaped recess 9 formed in that there is no projection 7 within the zone of this recess 9. Obviously, there may be several recesses; this is necessary, where more than two supporting elements are provided. The two pipe ends must be so assembled that the recess 9 is located between the supporting elements 4.

Figure 2:
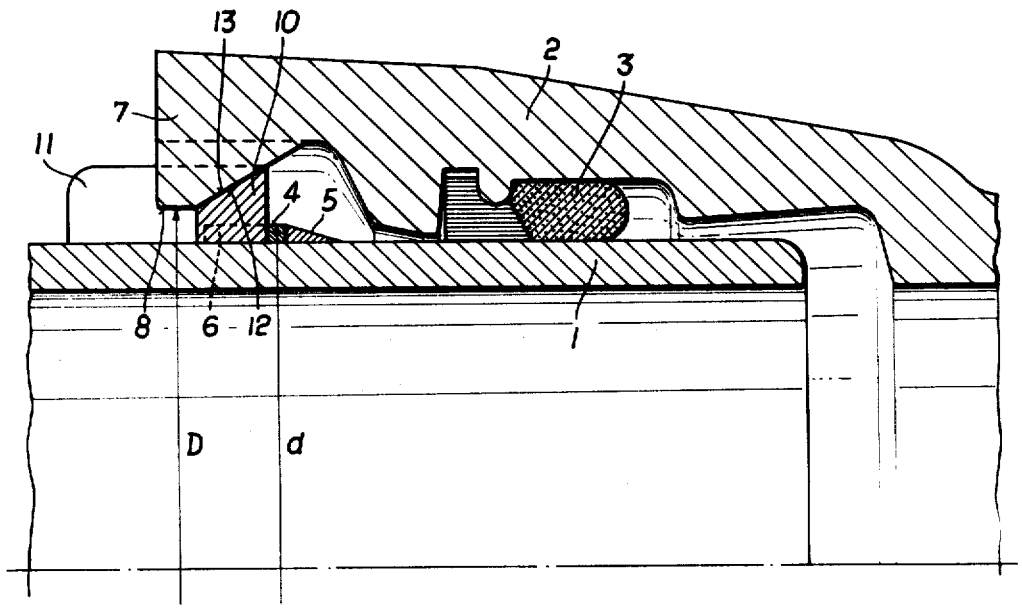
FIGS. 2 and 3 are cross-sections along the lines II—II and III—III in FIG. 1.
Figure 3:
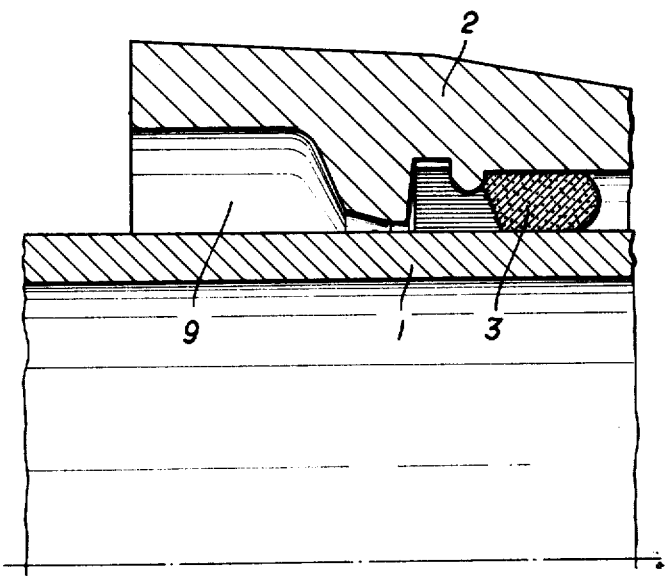

To provide a thrust-proof joint to the two pipe ends, there are provided connecting members 10, the number of which corresponds to the number of the supporting elements 4. These connecting members are inserted into the recess 9 and are then turned or rotated towards one side and towards the other side so that they are located between the supporting elements 4 of the one pipe end 1 and the projection 7 of the other pipe end 2, forming a locking device. Such a locking element is shown in side elevation in FIG. 4. As may be seen from this FIGURE and also from FIG. 2, each connecting member has a lug 11 at one end, extending in the axial direction of the pipe and resting on an edge of the recess 9, or on an end of the projection 7, after the connecting element has been inserted. This ensures that the connecting or locking members are rotated into the correct position and prevents them from being pushed in too far. To prevent the accidental withdrawal of the locking members 10, the part 6 of the supporting elements 4, which is not fixed by welding, is bent over and abuts on the projection 11 so that each locking member is secured against displacement in both directions.

To make possible the bending or angling of the pipeline at the joint in accordance with the possibilities given by the ring seal 3, both the surface 12 of the locking members 10 and the surface 13 of the projection 7 have the shape of a spherical shell, and both these spherical shells have the same diameters. Obviously, it is also possible to use the invention not only for connecting pipes, but also for connecting a pipe with a pipe section or for interconnecting pipe sections.

What I claim is:

1. A connection for pipes, pipe section and the like, made preferably by centrifugal casting methods, wherein said pipe comprises a first narrow end of an adjoining identical pipe and a second socket end adapted to receive a narrow end, wherein said narrow end has external supporting elements circumferentially arranged on the exterior surface thereof and said socket end has at least one internally protruding projection circumferentially arranged on the interior surface thereof arcuately adjacent said supporting elements, the relative diameters of said supporting elements and said projection being such that said projection can concentrically receive said supporting elements and further including at least two segmented locking members adapted to rest against both said supporting elements and said projection to thereby lock adjoining pipes to one another, and at least one segment-shaped recess formed within said socket which has a circumferential length only slightly greater than the length of each of said locking members for receiving said locking members, said recess being off-set circumferentially relative to said supporting elements and projection so that said locking members may, after insertion through said recess into a position between said projection and said supporting elements, be rotated in opposite circumferential directions to rest against said supporting elements and said projection to thereby lock the pipes, said socket end also including an annular depression on the interior surface thereof axially removed from said projection for receiving a sealing ring of elastomeric material which sealingly engages the circumference of said narrow end whereby the joint between adjacent pipe sections is sealed and wherein said sealing ring is axially spaced from said supporting elements and said locking members.

2. A connection as claimed in claim 1, wherein the recesses are formed through said projection.

3. A connection as claimed in claim 1, wherein each locking element has a lug resting in the locking position on the socket, preferably on an edge of the recess.

4. A connection as claimed in claim 1, wherein a securing device against loss of the locking members and formed preferably by a bendable portion of a supporting element, is provided.

5. A connection as claimed in claim 1, wherein the supporting elements are mounted on the narrow pipe end by welding, and the safety against loss of the locking members is preferably formed by an end of the supporting elements not connected by welding.

6. A connection as claimed in claim 1 wherein the contacting surfaces of the projection and of the locking members are of spherical configuration and have preferably the same radius.

* * * * *

UNITED STATES PATENT OFFICE
CERTIFICATE OF CORRECTION

Patent No. 3684320          Dated August 15, 1972

Inventor(s) Herbert PLATZER, Erich SINGER and Franz WASSERMANN

It is certified that error appears in the above-identified patent and that said Letters Patent are hereby corrected as shown below:

Add to the heading:

--- Applicants claim priority of Austrian Patent Application Serial No. A5170/69, filed May 30, 1969. ---

--- The third inventor's first name is spelled Franz ---

Signed and sealed this 6th day of February 1973.

(SEAL)
Attest:

EDWARD M. FLETCHER, JR.
Attesting Officer

ROBERT GOTTSCHALK
Commissioner of Patents